US 6,976,671 B2

(12) United States Patent
Migliori

(10) Patent No.: US 6,976,671 B2
(45) Date of Patent: Dec. 20, 2005

(54) TOGGLE-LEVER CLAMPING DEVICE FOR CLAMPING WORK PIECES WITH SELF-COMPENSATION

(75) Inventor: Luciano Migliori, Milan (IT)

(73) Assignee: UNIVER S.p.A., Milan (IT)

( * ) Notice: Subject to any disclaimer, the term of this patent is extended or adjusted under 35 U.S.C. 154(b) by 0 days.

(21) Appl. No.: 10/879,099

(22) Filed: Jun. 30, 2004

(65) Prior Publication Data

US 2005/0017424 A1    Jan. 27, 2005

(30) Foreign Application Priority Data

Jul. 24, 2003  (IT) .......................... MI2003A1519

(51) Int. Cl.⁷ ............................................... B23Q 3/02
(52) U.S. Cl. ....................................... 269/32; 269/27
(58) Field of Search ............................. 269/32, 49, 24, 269/25, 27, 201, 228, 237; 74/470, 105

(56) References Cited

U.S. PATENT DOCUMENTS

| | | | |
|---|---|---|---|
| 5,676,357 A | 10/1997 | Horn | |
| 6,698,736 B2 * | 3/2004 | Dugas et al. ................. | 269/32 |
| 6,739,587 B2 * | 5/2004 | Migliori ...................... | 269/32 |
| 6,786,478 B2 * | 9/2004 | Pavlik et al. ................. | 269/49 |
| 2005/0012258 A1 * | 1/2005 | Migliori ...................... | 269/32 |
| 2005/0017424 A1 * | 1/2005 | Migliori ...................... | 269/32 |

FOREIGN PATENT DOCUMENTS

| | | |
|---|---|---|
| DE | 89 13 386 | 3/1991 |
| DE | 39 36 396 | 4/1991 |
| EP | 1 250 984 A1 | 10/2002 |
| EP | 1 393 861 A2 | 3/2004 |
| EP | 1 447 174 A2 | 8/2004 |
| FR | 2 675 417 | 10/1992 |

* cited by examiner

Primary Examiner—Lee D. Wilson
(74) Attorney, Agent, or Firm—Young & Thompson

(57) ABSTRACT

A toggle-lever clamping device for clamping work pieces includes a box-shaped body which supports a clamping member movable between a forward disengaging position and a backward position for clamping the work piece. The device also includes control elements operatively connected to the clamping member by elements of an intermediate toggle-lever connecting link, and an articulated quadrilateral system; the intermediate connecting link is in the form of an axially yieldable flat spring having a plurality of side by side arranged elastically yieldable spring sections, aligned according to its longitudinal axis. The articulated quadrilateral system and the intermediate connecting link are constructed and disposed in such a way as to maintain an irreversible locking condition of the clamping member to clamp work pieces, compensating differences in thickness of the work pieces.

11 Claims, 4 Drawing Sheets

TOGGLE-LEVER CLAMPING DEVICE FOR CLAMPING WORK PIECES WITH SELF-COMPENSATION

BACKGROUND OF THE INVENTION

This invention concerns a toggle-lever clamping device for clamping work pieces, used in particular for underbody tightening and/or centering sheet metal parts in the manufacturing of motor vehicles, or for other similar uses.

STATE OF THE ART

In general, toggle-lever clamping devices are known, which are normally used for tightening and/or centering work pieces, along edges or through appropriate holes of the same work pieces, locking them against a shoulder surface of the same device, or against supporting structure.

A clamping device of the aforementioned kind is for example described in DE 39 36 396. The device comprises a box-shaped body having a longitudinal axis, and a hook-shaped clamping member protruding from an elongated aperture at a fore end of the box-shaped body; the clamping member is supported by the box-shaped body to perform a movement in a longitudinal and cross direction, between a forward disengaging position and a backward clamping position in which it locks the work piece.

The clamping device is also provided with control means for the clamping member, which comprises a thrust member sliding parallel to the longitudinal axis of the box-shaped body, an intermediate toggle-lever connecting link and an articulated quadrilateral system.

The articulated quadrilateral system in turn comprises a first and second crank members spaced apart in the direction of the longitudinal axis of the box-shaped body, which are pivotally supported to rotate on a respective pivotal axes; the crank members are in turn connected to the clamping member by means of respective hinge pins.

One of the crank members, in particular the crank member close to the fore end of the box-shaped body, is provided with a lever arm articulated to the toggle-lever connecting link.

A clamping device of this kind however has the drawback that whenever it is required to lock work pieces of different thickness, an operator must necessarily adjust the position of the device with respect to the work piece to be locked, and/or provide a shoulder and/or supporting surface for the work pieces having a suitable disposition for clamping the work pieces, in relation to their thickness.

This involves considerable consumption of time and costs due to the need to stop the production lines in order to carry out the necessary setting operations.

For the purposes of this description, the expression "different thickness" is understood to mean that the differences in thickness of the work pieces are in the range of millimeters.

OBJECTS OF THE INVENTION

An object of this invention is to provide a clamping device for work pieces, of the aforementioned kind, which is structurally simple, highly reliable, and which can clamp work pieces of different thickness without the need for adjustments and/or settings by an operator, by automatically compensating the differences in thickness of the work pieces.

Another object of this invention is to provide a clamping device of the aforementioned kind, which can be optionally used as a conventional clamping device, in which the internal stresses are limited, and the slack between inner mechanical is automatically taken up.

BRIEF DESCRIPTION OF THE INVENTION

The above can be achieved by means of a toggle-lever clamping device for clamping work pieces, of the type comprising:

a box-shaped body having a longitudinal axis;

at least one hook-shaped movable clamping member which partially protrudes from an elongated aperture at a fore end of said box-shaped body, said clamping member being movably supported between a forward disengaging position and a backward clamping position in which it locks a work piece;

control means being provided for controlling the clamping member, said control means being operatively connected to the clamping member by an intermediate toggle-lever connecting link, having a longitudinal axis, and an articulated quadrilateral system, said intermediate toggle-lever connecting link having a dead center position, which corresponds to a condition of irreversibility of the clamping member movement in its backward clamping position, characterised in that the intermediate toggle-lever connecting link is in the form of an axially yielding flat spring, said flat spring comprising a plurality of side by side arranged elastically yieldable spring sections; and in that the articulated quadrilateral system and the intermediate toggle-lever connecting link are constructed and disposed in such a way as to maintain an irreversible clamping condition of the clamping member to lock the work piece, compensating differences in thickness of the work pieces by means of a corresponding elastic yielding of the intermediate connecting link.

BRIEF DESCRIPTION OF THE DRAWINGS

These and further features of the clamping device according to this invention, will be more clearly evident from the following description with reference to the accompanying drawings, in which.

DETAILED DESCRIPTION OF THE INVENTION

Figure 1:
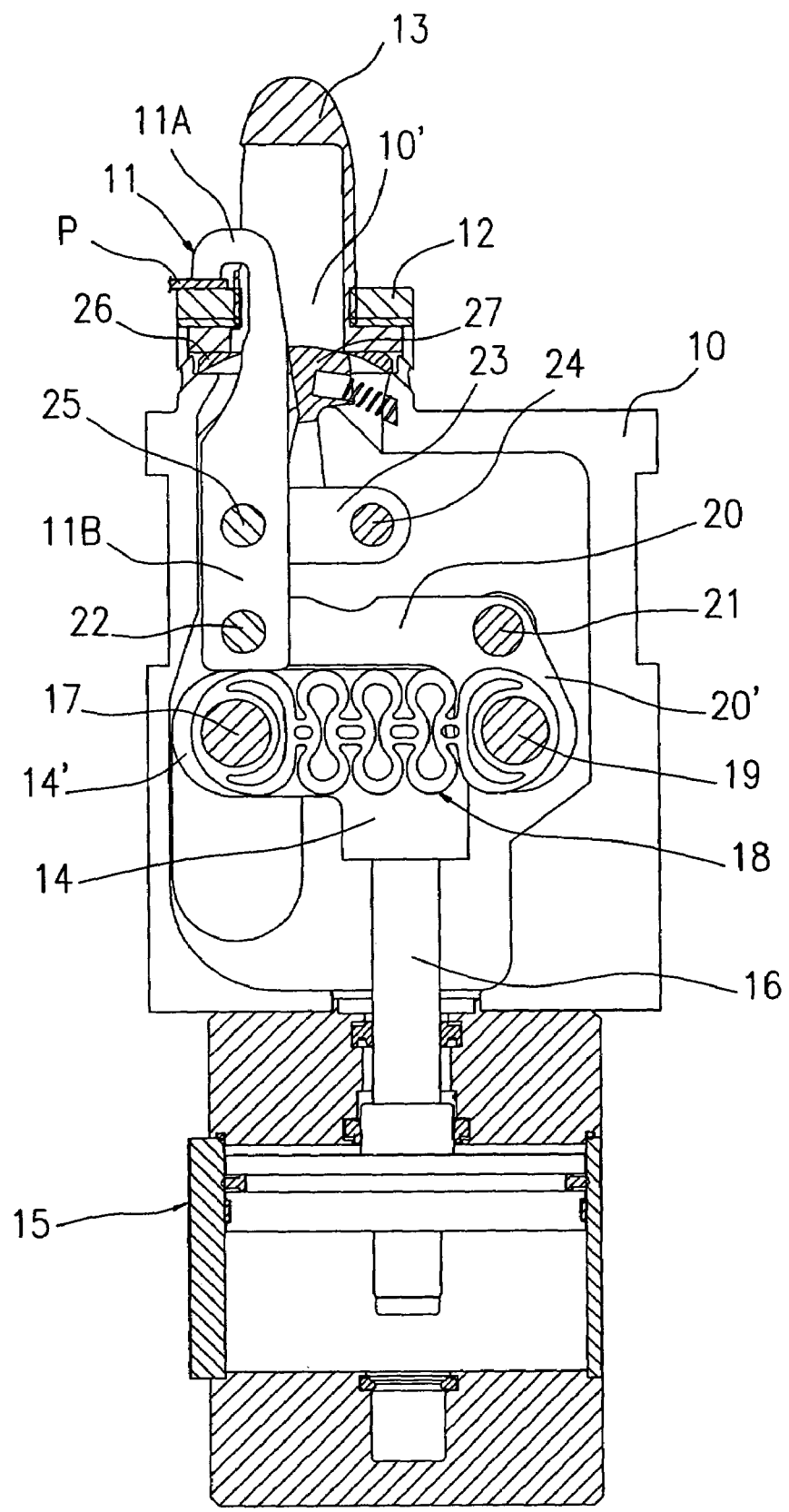
FIG. 1 shows a longitudinal sectional view of a clamping device for clamping work pieces according to the invention, with the clamping member is in a backward position in which it clamps a work piece.

The general features of this invention will be illustrated hereunder by means of some embodiments.

The toggle-lever clamping device for clamping work pieces according to the invention, shown in the FIGS. 1 to 5, comprises a box-shaped body 10 having a longitudinal axis, which supports at least one movable clamping member 11, in this case one.

The clamping member 11 comprises a hook-shaped fore portion 11A which partially protrudes from an elongated aperture 10' at a fore end of the box-shaped casing 10, and a rear portion or shank 11B supported by the box-shaped body 10 to perform a longitudinal movement and a cross movement, between a forward disengaging position and a backward clamping position in which it clamps a work piece P against a shoulder, for example a supporting plate 12 secured to the fore end of the box-shaped body 10.

The clamping member 11, by its rear shank 11B, is operatively connected to control means capable of imparting the aforesaid movement to the clamping member 11.

The clamping device can be provided with a hollow centering stem 13, defining a longitudinal centering axis for the work pieces, which can be secured to the fore end of the box-shaped body 10, for example by means of the supporting plate 12.

Figure 2:
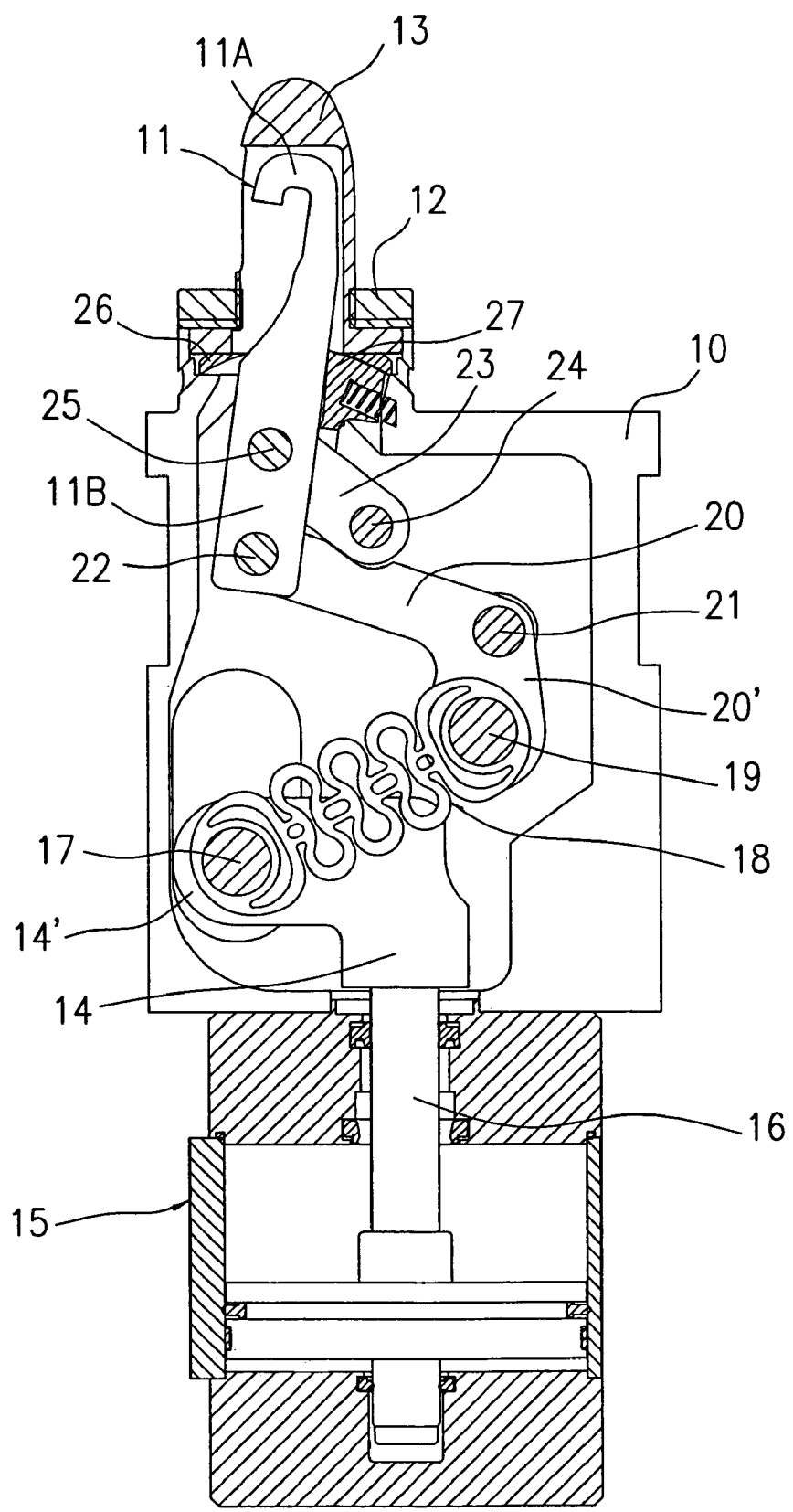
FIG. 2 shows a longitudinal sectional view of the clamping device for clamping work pieces of FIG. 1, with the clamping member in a forward disengaging position in which it releases a work piece.

The centering stem 13 is provided with a cavity for housing the hook-shaped portion 11A of the clamping member 11 in its forward position, as shown in FIG. 2, and a side slit from which the clamping member protrudes in its backward position to clamp the work piece, as shown in FIG. 1.

The device also comprises control means operatively connected to the clamping member 11 in turn comprising for example a pneumatic or electric linear actuator 15, having a rod 16 operatively connected to a thrust member 14, sliding parallel to the longitudinal axis of the box-shaped body 10. As an alternative, the control means can comprise a manual control lever, not shown, operatively connected to the clamping member 11.

Preferentially, the sliding axis of the thrust member 14, the longitudinal axis of the box-shaped body 10 and the aforesaid centering axis are parallely arranged and substantially close to each other, so as to have the smallest possible dimensions in the cross movement direction of the clamping member 11.

The thrust member 14 on one side is provided with a fork shaped extension member 14', to which is connected, by means of a hinge pin 17, an intermediate toggle-lever connecting link 18 having a longitudinal axis, which is of the axially controlled elastically yielding type; the hinge pin 17 for connecting the toggle link 18 to the fork shaped extension 14' of the thrust member 14, is thus spaced apart on a side of the sliding axis of the thrust member 14.

The intermediate connecting link 18 is in turn connected, by means of a hinge pin 19, to a lever arm 20' of a first crank member 20 of an articulated quadrilateral system, which supports the clamping member 11 and operatively connects it to the control means.

The connecting link 18 and the lever arm 20' form a toggle-lever mechanism which has a per se known dead center position, which corresponds with a condition of irreversibility of the clamping member movement 11 in its backward position in which it clamps the work piece.

The articulated quadrilateral system comprises the aforesaid first crank member 20, disposed close to the thrust member 14, which is supported by the box-shaped body 10 to rotate according to a first pivotal axis 21; the crank member 20 is connected to the clamping member 11 by means of a first hinge axis 22.

The lever arm 20' of the first crank member 20 is disposed at an angle with respect to the same crank member 20, and faces towards the thrust member 14.

Preferentially, the arm 20' of the first crank member 20 and the first crank member 20 itself form an angle ranging from 90° to 120°.

The articulated quadrilateral system also comprises a second crank member 23, disposed towards the fore end of the box-shaped body 10, which is supported by the same box-shaped body 10 to rotate according to a second pivotal axis 24; the second crank member 23 is connected to the clamping member 11 by means of a second hinge axis 25.

The intermediate toggle-lever connecting link 18 is in the form of an axially yielding flat spring, preferentially consisting of a pack of flat springs, comprising a plurality of side by side arranged elastically yieldable spring sections, aligned according to the longitudinal axis of the connecting link 18. A constructional structure of this kind allows the connecting link 18 to undergo considerable axial elastic deformation, at the same time achieving high reaction forces to the deformation of the connecting link 18 itself, which enable the clamping member 11 to exert high clamping forces on the work pieces.

Thanks to its high controlled elastic yielding capacity, the toggle-lever connecting link 18 consequently allows to automatically compensate any differences in thickness of the work pieces, up to differences in thickness in the range of some millimeters; moreover, the articulated quadrilateral system 20,23,11B and the intermediate connecting link 18 are shaped and disposed in such a way as to maintain the irreversible locking condition of the clamping member to lock work pieces, once the toggle-lever mechanism has gone slightly beyond its dead center position.

Each elastically yielding spring section of the intermediate toggle-lever connecting link 18 preferably comprises an annular shaped element 18' with opposite internal stop surfaces 18"; the different elastically yielding spring sections are side by side arranged and are connected to one another along the axis of the connecting link 18 itself.

Preferentially, the elastically yielding spring sections of the intermediate connecting link 18 comprise annular elements 18' shaped in a figure-of-eight, each having opposite arch shaped internal stop surfaces 18".

Figure 3:
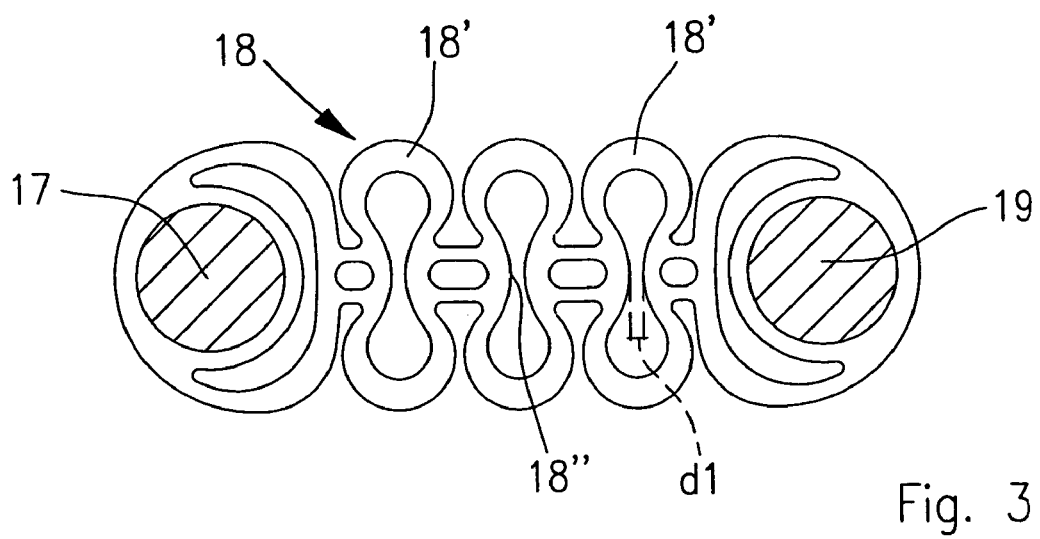
FIGS. 3, 4 and 5 show an intermediate toggle-lever connecting link of the clamping device, in three different axially deformed conditions.
Figure 4:
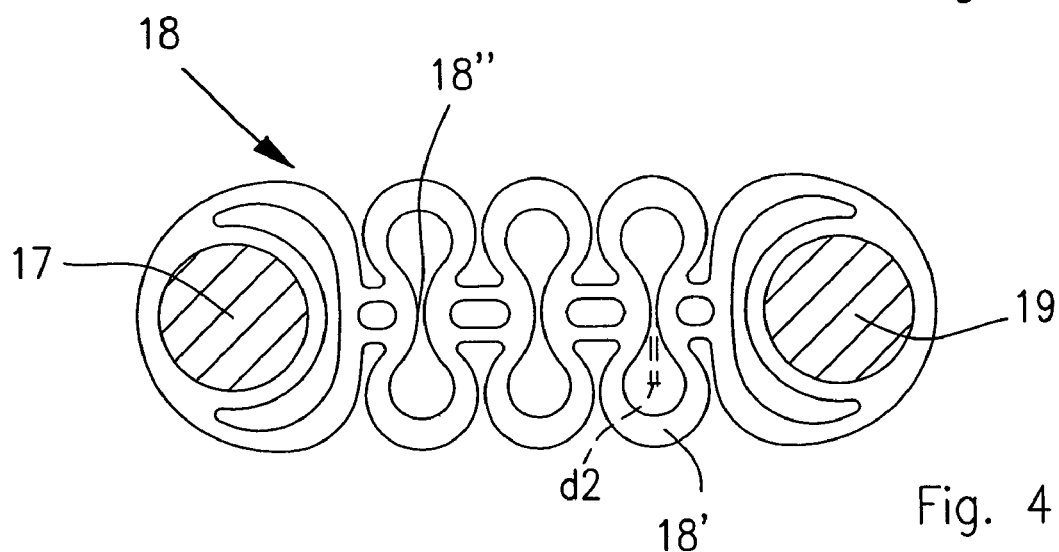
Figure 5:
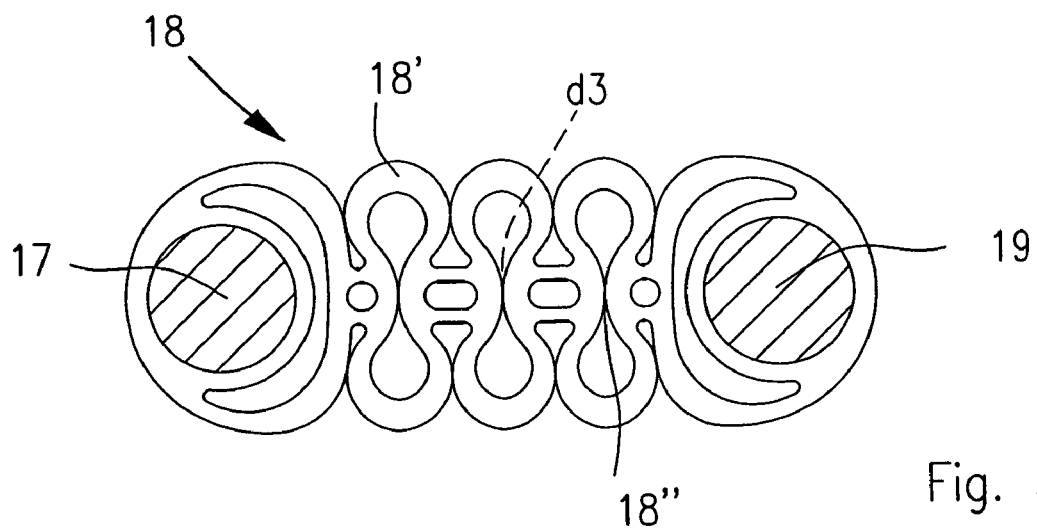

In the FIGS. 3 to 5, the intermediate connecting link 18 is shown in three different conditions of axial deformation, in relation to the thickness of the work pieces P, which are clamped.

In particular, FIG. 3 shows the connecting link 18 in the case in which a work piece of limited thickness is clamped; in such case, the connecting link 18 is in a slightly axially deformed condition, with the opposite stop surfaces 18" spaced apart from each other by a space d1.

FIG. 4 shows the connecting link 18 in the case in which a work piece of greater thickness is clamped; in such case, the connecting link 18 is in a more axially deformed condition, with the opposite stop surfaces 18" spaced apart from each other by a distance d2 shorter than d1.

Lastly, FIG. 5 shows the connecting link 18 in the case in which a work piece of the maximum thickness permitted by the device is clamped; in such case, the connecting link 18 is in a totally axially deformed condition, with the opposite stop surfaces 18" in contact with each other, at a space d3 equivalent to zero.

The toggle-lever connecting link 18, in the direction of the longitudinal axis of the box-shaped body 10, is disposed between the articulated quadrilateral system and the thrust member 14 of the control means; such disposition of the connecting link results in a considerable reduction of the dimensions of the device in the direction of the cross movement of the clamping member 11, achieving a considerable improvement in the possibilities of handling the work pieces and the tools necessary for the various operations close to the clamping device.

Moreover, the hinge pins 17 and 19 of the toggle-lever connecting link 18, respectively with the thrust member 14 and with the arm 20' of the first crank member 20, are disposed on opposite sides of the thrust member 14 in the backward position of the clamping member 11.

The first crank member 20 of the articulated quadrilateral system has a length greater than the second crank member 23 of the same system; preferentially, the ratio between the length of the first crank member 20 and that of the second crank member 23 of the articulated quadrilateral system is comprised between 1.5 to 2.5.

The first crank member 20 of the articulated quadrilateral system is also of a greater length than the lever arm 20' of the same crank member 20; in particular, the ratio between the length of the first crank member 20 of the articulated quadrilateral system and that of its lever arm 20' is comprised for example between 2 to 3.

The clamping device also comprises scraping and cleaning means capable of preventing the penetration of dirt through the elongated aperture at the fore end of the box-shaped body 10; the cleaning means in turn comprise a closing plate 26, housed in an appropriate seat at the fore end of the box-shaped body 10, and a movable scraping member 27, which have respective cross scraping edges which slide in contact with corresponding shaped side surfaces of the clamping member 11 during its movement.

Figure 6:
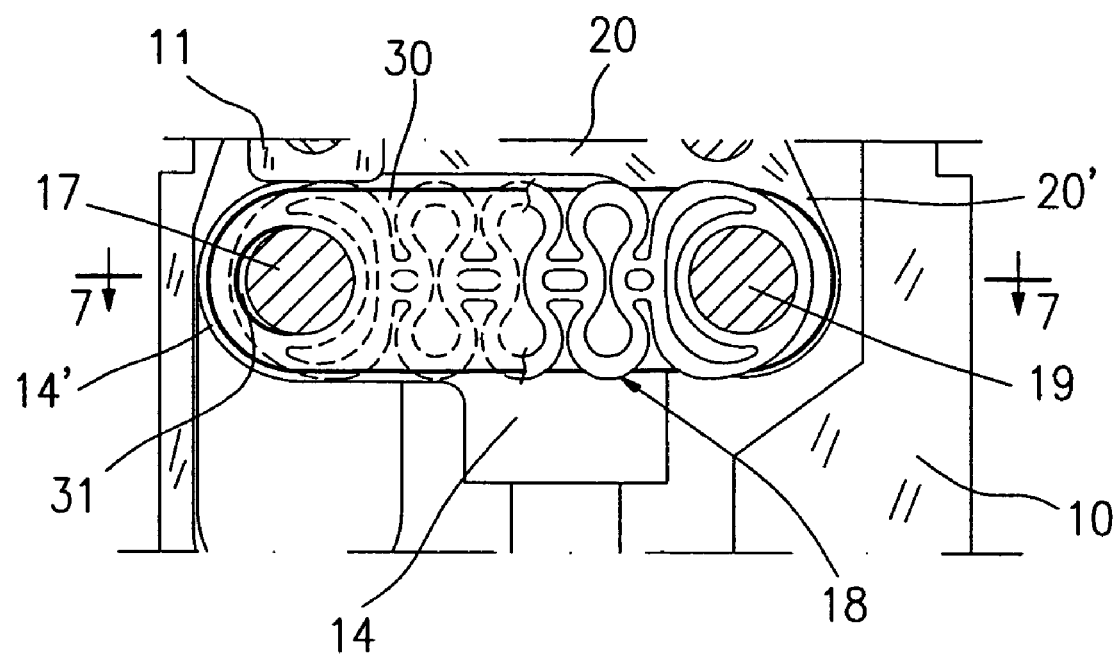
FIG. 6 shows an enlarged detail of the connecting link of the device, according to another embodiment.
Figure 7:
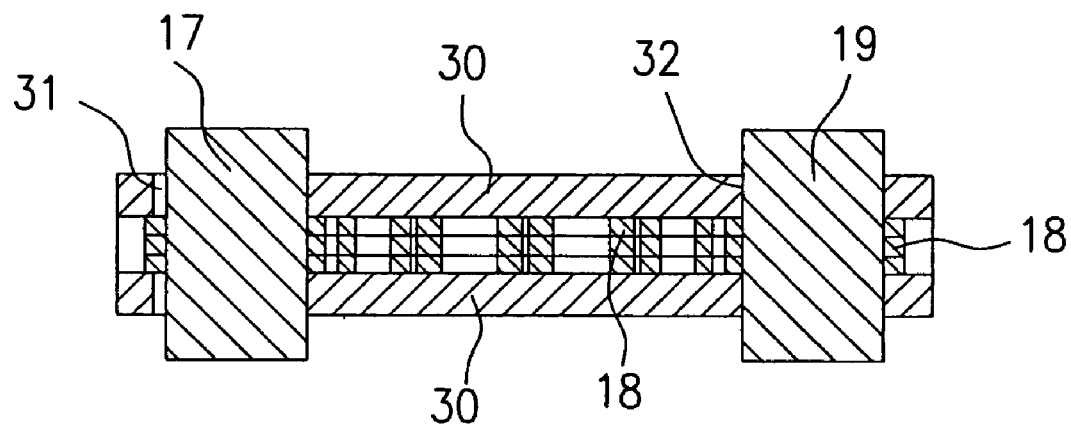
FIG. 7 shows a longitudinal section of the toggle-lever connecting link of FIG. 6, according to line 7—7.

As illustrated in FIGS. 6 and 7, the clamping device of the invention can further comprise additional limiting means for limiting the yielding of the toggle connecting link 18 in the axial direction.

Such an additional limiting means preferentially comprise at least one limiting plate 30 connected to the hinge pins 17, 19 of the toggle-lever connecting link 18 respectively by a first and a second through holes 31, 32 at the ends of the limiting plate 30; in this case, the device comprises a first and a second limiting plate 30, parallely arranged on opposite sides of the flat spring of the connecting link 18.

In order to allow a controlled axial yielding movement of the toggle-lever connecting link 18, at least one of said first and second through holes 31 and 32 is in the form of a slot extending in the axial direction of the connecting link axis, as illustrated in FIGS. 6 and 7, in which only the hole 31 is in the form of a slot.

Therefore, it is possible to modify the operation of the device, as regards the axial yielding of the connecting link 18, by simply providing the same device with limiting plates 30 having a slot or hole 31 of different axial dimensions.

In this way, the clamping device can be used according to different manners, in relation to the clamping requirements of the work pieces in the production lines.

In particular, according to a first use, the device is not provided with the limiting plates 30 for the connecting link yielding, thus allowing a complete axial yielding of the same toggle-lever connecting link 18, in such a way to automatically compensate great differences in the work piece thickness, up to some millimeters.

According to a second use, the device is provided with the limiting plates 30 for the connecting link each having a respective slot or hole 31, thus allowing a predetermined axial yielding movement of the toggle-lever connecting link 18; in such a way it is allowed a more limited compensation of the work piece thickness and/or an axial preloading of the connecting link 18, while evidencing possible work piece thickness differences when the clamping member 11 doesn't reach a correct clamping position.

According to a third use, the device is provided with limiting plates 30 for the connecting link yielding, having slots or through holes 31 of greater length, thus allowing to the connecting link 18 of the device to assume a nearly rigid configuration in order to define an exact clamping geometry, while compensating also internal clearances of the device.

In the second and third cases, the flat spring of the connecting link 18 can have a limited thickness, since the axial thrust in these cases is exerted by the limiting plates 30, so it is not necessary to have a flat spring of full thickness dimensions.

What has been described and shown with reference to the accompany drawings has been given purely by way of example in order to illustrate the general features of the invention, and of several of its preferential embodiments; consequently, other modifications and variations to the toggle-lever clamping device for clamping work pieces are possible, without thereby deviating from the scope of the appended claims.

What is claimed is:

1. Toggle-lever clamping device for clamping work pieces, of the type comprising:

a box-shaped body having a longitudinal axis;

at least one hook-shaped clamping member which partially protrudes from an elongated aperture at a fore end of said box-shaped body, said clamping member being movably supported between a forward disengaging position and a backward clamping position in which it locks a work piece;

control means being provided for controlling the clamping member, said control means being operatively connected to the clamping member by an intermediate toggle-lever connecting link, having a longitudinal axis, and an articulated quadrilateral system, said intermediate toggle-lever connecting link having a dead center position, corresponding to a condition of irreversibility of the clamping member movement in its backward clamping position, characterised in that the intermediate toggle-lever connecting link is in the form of an axially yielding flat spring, said flat spring comprising a plurality of side by side arranged elastically yieldable spring sections; and in that the articulated quadrilateral system and the intermediate toggle-lever connecting link are constructed and disposed in such a way as to maintain an irreversible clamping condition of the clamping member to lock the work piece, compensating differences in thickness of the work pieces by means of a corresponding elastic yielding of the intermediate connecting link.

2. The toggle-lever clamping device for work pieces according to claim 1, in which the articulated quadrilateral system comprises a first crank member having a lever arm hinged to the toggle-lever connecting link, and a second crank member, said first and second crank members being pivotally supported by to the box-shaped body and hinged to the clamping member, at axially spaced apart points, characterised in that the toggle-lever connecting link, in the direction of the longitudinal axis of the box-shaped body, is disposed between the articulated quadrilateral system and the thrust member of the control means; and in that the toggle-lever connecting link is connected to the thrust member, respectively to the lever arm of the first crank member by hinge pins, said hinge pins being disposed on opposing sides of the thrust member in the backward position of the clamping member.

3. The toggle-lever clamping device for work pieces according to claim 2, characterised in that the first crank member of the articulated quadrilateral system has a length greater than the second crank member.

4. The toggle-lever clamping device for work pieces according to claim 3, characterised in that the ratio between the length of the first crank member and the length of the second crank member of the articulated quadrilateral system is comprised between 1.5 to 2.5.

5. The toggle-lever clamping device for work pieces according to claim 2, characterised in that the first crank member of the articulated quadrilateral system has a length greater than the lever arm of said crank member.

6. The toggle-lever clamping device for work pieces according to claim 5, characterised in that the ratio between the length of the first crank member of the articulated quadrilateral system and the length of its lever arm is comprised between 2 to 3.

7. The toggle-lever clamping device for work pieces according to claim 2, characterised in that the lever arm of the first crank member and the first crank member itself form an angle ranging between 90° to 120°.

8. The toggle-lever clamping device for work pieces according to claim 1, characterised in that each elastically yielding spring section of the intermediate toggle-lever connecting link comprises a shaped annular element having opposite internal stop surfaces, the different elastically yielding spring sections being side by side arranged, and being connected to one another along the longitudinal axis of the connecting link.

9. The toggle-lever clamping device for work pieces according to claim 8, characterised in that each elastically yielding spring section of the intermediate toggle-lever connecting link comprises a figure-of-eight shaped annular element, having opposite internal arch shaped stop surfaces.

10. The toggle-lever clamping device for work pieces according to claim 1, characterised by comprising additional limiting means for limiting the yielding in the axial direction of the toggle connecting link.

11. The toggle-lever clamping device for work pieces according to claim 10, characterised in that said additional limiting means comprise at least one limiting plate connected to the hinge pins of the toggle-lever connecting link by a first and a second through holes, at least one of said first and second through holes being in the form of slot extending in the axial direction of the connecting link.

* * * * *